United States Patent [19]

Albers

[11] Patent Number: 4,773,762
[45] Date of Patent: Sep. 27, 1988

[54] CONTINUOUS MIXING AND SHEARING ROLLING MILL

[76] Inventor: August Albers, Grissheimer Weg 7, D-7843 Heitersheim, Fed. Rep. of Germany

[21] Appl. No.: 11,661

[22] Filed: Feb. 5, 1987

[30] Foreign Application Priority Data

Feb. 6, 1986 [EP] European Pat. Off. ...... 85 116 647.0

[51] Int. Cl.$^4$ .............................................. B29B 7/56
[52] U.S. Cl. ..................................... 366/69; 366/144; 425/201
[58] Field of Search ............ 29/116 AD, 121.1, 121.4; 366/69, 72, 73, 74, 96, 97, 144, 145, 75, 76, 77, 83, 85, 297, 298, 299, 300, 301; 241/66, 67, 235; 425/200, 201, 204, 208, 366, 384, 363, 335

[56] References Cited

U.S. PATENT DOCUMENTS

| | | | |
|---|---|---|---|
| 2,286,405 | 6/1942 | Gordon | 264/142 |
| 2,442,443 | 6/1948 | Swallow | 425/384 |
| 2,582,165 | 1/1952 | Rosenfeld | 425/384 |
| 2,663,901 | 12/1953 | Hale et al. | 425/201 |
| 2,940,350 | 6/1960 | Varn | 83/482 |
| 3,070,836 | 9/1963 | De Haven et al. | 425/204 |
| 3,595,533 | 7/1971 | Sutter | 366/75 |
| 3,993,291 | 11/1976 | Brinkman | 425/201 |
| 4,197,070 | 4/1980 | Koschman | 366/145 |
| 4,605,309 | 8/1986 | Albers | 366/76 |

FOREIGN PATENT DOCUMENTS 0148966 7/1985 European Pat. Off. .
979584 1/1965 United Kingdom .

Primary Examiner—Harvey C. Hornsby
Assistant Examiner—J. Dwight Poffenberger, Jr.
Attorney, Agent, or Firm—Foley & Lardner, Schwartz, Jeffery, Schwaab, Mack, Blumenthal & Evans

[57] ABSTRACT

A continuous shearing rolling mill is disclosed with improved roll drive system, roll temperature control, surface and groove geometries of the shearing rolls, and material discharge and pelletizing devices on the front roll.

22 Claims, 9 Drawing Sheets

CONTINUOUS MIXING AND SHEARING ROLLING MILL

BACKGROUND OF THE INVENTION

The present invention relates to a process and a rolling mill for the continuous transportation, mixing, homogenization, dispersion and plastication of plastic or plasticizable materials in the shear gap of two counter-rotating temperature-controlled rolls of the type shown in applicant's prior U.S. Pat. No. 4,605,309.

Trials have shown that the melt behavior of the materials to be processed varies a great deal. Accordingly, for each material when in the various states of solid, plastic or liquid, there is an optimum groove geometry, an optimum temperature and an optimum shear force effect on the material.

SUMMARY OF THE INVENTION

It is therefore an object of the present invention to provide a mixing and shearing rolling mill wherein the rotational speed of the shearing rolls can be varied with respect to each other.

It is also an object of the present invention to provide a mixing and shearing rolling mill which can vary the shear forces of the material.

It is a further object of the present invention to provide a mixing and shearing rolling mill in which the temperature of different sections of the shearing rolls can be varied.

Another object of the present invention is to provide a mixing and shearing rolling mill in which the frictional heat can be increased by changing the roll surface geometry.

It is still another object of the present invention to provide a mixing and shearing rolling mill in which the mixing effect can be increased by a predetermined roll surface geometry.

It is yet another object of the present invention to provide a mixing and shearing rolling mill which permits relatively easy changing of the groove geometry of the rolls.

It is another object of the present invention to provide a mixing and shearing rolling mill compatible with desired material discharging devices.

In accordance with one aspect of the present invention these objects are achieved by a mixing and shearing rolling mill for plasticizable material, comprising: two adjacent rotatable rolls having a face width comprising a plurality of independently controllable temperature zones, wherein at least two of the temperature zones are maintained at different temperatures, the face width being more than four times the roll diameter and comprising a plurality of sharp-edged shear grooves arranged obliquely on the surface thereof at an acute angle and counter to each other. Both the number of the shear grooves on the roll circumference and the depth of the shear grooves increase along the roll axis from the bearing side, have a material throat up to the roll center and decrease again from the roll center to the bearing side at the material discharge end. Optionally, a material discharging device can be provided which is adjustable in the axial direction along the roll gap.

Other objects, features and advantages of the present invention will become apparent from the following detailed description. It should be understood, however, that the detailed description and specific drawings, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An illustrative embodiment of the invention is described in further detail below and is represented schematically in the drawing, in which.

DETAILED DESCRIPTION OF THE PREFERRED EMBODIMENTS

An embodiment of the present invention is characterized by the fact that the frictional relationship of the two adjacent rotating shearing rolls is periodically varied in a short rhythm by a controlled speed change of the rolls in adaptation to the plasticizing behavior of the material.

During a processing time of, for example, between about 60 and about 250 seconds, a material particle moves from the charging side to the discharging side. According to an embodiment of the present invention, the speed relationship of the two rotating shearing rolls is periodically varied at a ratio of about 5 to about 1 to about 1 to about 5 in a time rhythm of, for example, between about 5 and about 50 seconds. Accordingly, the material particle is repeatedly exposed to varying shear forces in the kneading boss and on the roll.

Externally, the effect of the shearing roll speed change is also recognizable from the changing size and direction of rotation of the kneading stock in the shear gap.

Figure 1:
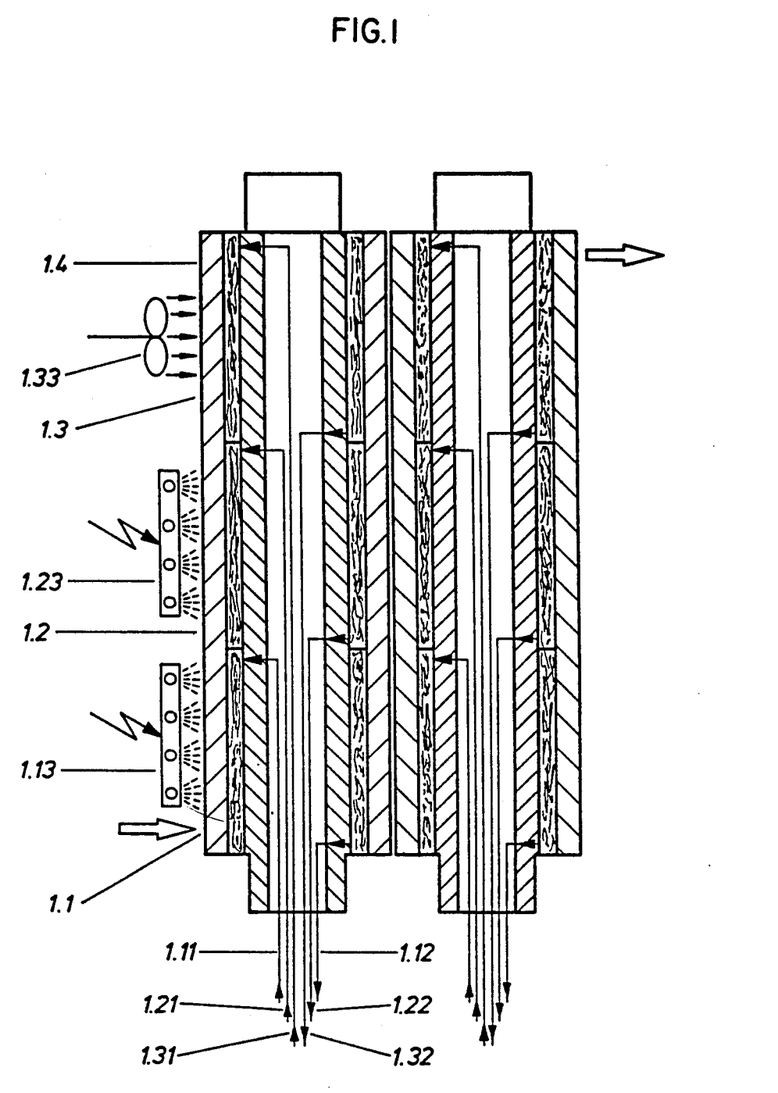
FIG. 1 shows a mixing and shearing rolling mill.

In a further embodiment, the two shearing rolls are fitted along the product path with different temperature control zones. On smaller machines at least two temperature control zones are fitted along the face width of the rolls. On larger rolls (from a face width of approximately 1500 mm) at least three different temperature zones are preferred. Each temperature zone is controlled by separate supply and drainage lines of the various temperature control liquids as shown in FIG. 1.

On the charging side of the material, the roll sections are heated in such a way that the material to be processed adheres to the surface of the rolls. In FIG. 1, the temperature of the roll section of the charging side 1.1 is controlled by the lines 1.11 and 1.12. This section has to be heated considerably more than the middle zone 1.2 and the zones 1.3 and 1.4. In many cases, it is useful to intensify the heating of the charged material by a protective heating with infrared radiators 1.13.

In the case of a number of viscous plastic materials, shear forces generate considerable frictional heat in the roll section 1.2, which has to be controlled. This frictional heat is controlled by the inner, second temperature control zone with supply and drainage lines 1.21 and 1.22 and the outer protective heating 1.23.

In the third roll section 1.3, in most cases, a reduction in the material temperature is effected by heat being removed from the inside via the lines of the third temperature control zone 1.31 and 1.32 and a fan cooling unit 1.33 being attached from the outside.

In the case of thermoplastic materials which are melted, for example, from the state of powder or pellets, according to a further embodiment of the present invention a considerably different groove geometry of the two shearing rolls has proven advantageous.

Figure 2A:
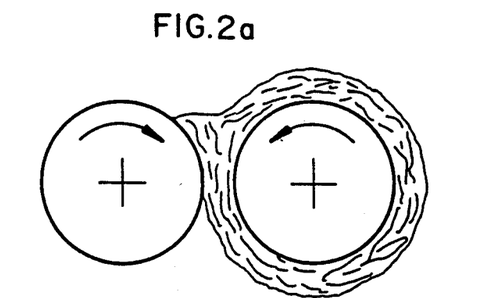
FIGS. 2a and 2b show, respectively, end elevation and top plan views of two adjacent rotatable rolls equipped with shear grooves.
Figure 2B:
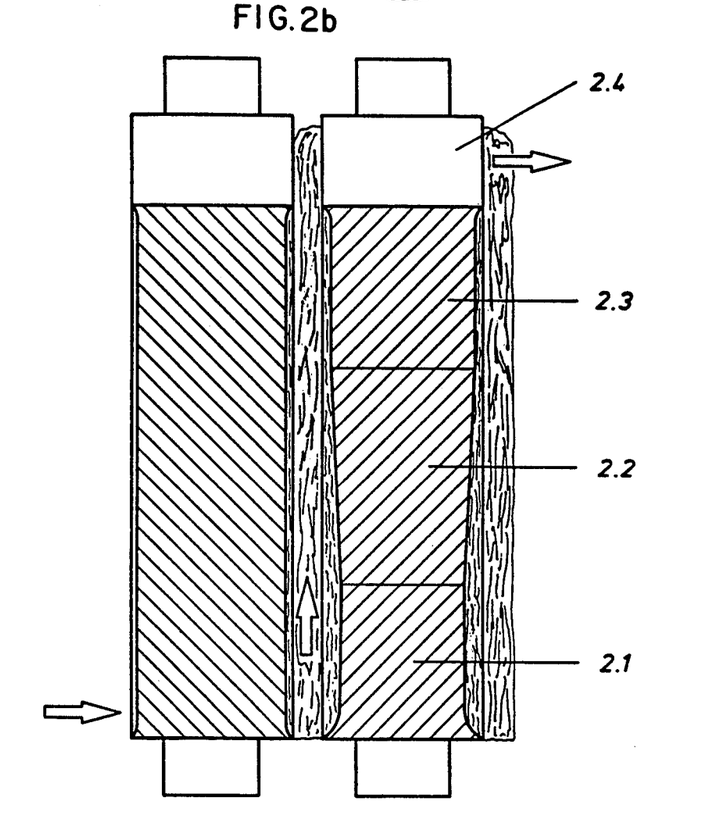

According to the embodiment shown in FIGS. 2a and 2b, the material-coated conveying roll is equipped with shear grooves having different geometries along the face width.

In the region of the material throat 2.1, shear grooves of about 0.5 to about 20 mm, preferably about 5 mm, in depth and about 1 to about 40 mm, preferably about 10 mm, in width are machined in.

The shear grooves are cut in to a uniform depth over a length of 25–30% of the roll face and form the material charging and preheating zone 2.1.

In the middle section 2.2, which makes up about 35–40% of the face width, the groove depth is reduced continuously to approximately half the value of the charging zone, preferably to a depth of about 2.0 to about 2.5 mm, as with a constant-taper screw. In the case of a number of materials which are very viscous, it is advantageous here to double the number of grooves to improve material transport.

In the third roll section 2.3, which makes up approximately 25–30% of the face width, homogenization and cooling of the material occur. The groove depth is kept constant from the outlet of the constant-taper middle zone 2.2 up to the groove outlet.

The material cooling in the third and fourth roll sections 2.3 and 2.4 reduces the adhesive tendency at the rolls. The material strength also increases at lower temperatures.

This embodiment facilitates the discharge of the material as strips and, in the case of pelletizing, prevents agglomeration of the pellets.

According to the present invention, the fourth roll section 2.4 is designed without grooves, accounting for about 10–15% of the face width on both rolls.

It was found in the trials that, in the case of materials with higher melting and softening ranges, occasionally the generation of a plastic material coating on the working roll causes problems as long as the material temperature in the charging zone is not yet high enough to effect sufficient material adhesion at the grooves and at the surface. Additional frictional heat from shear forces can only be introduced into adhering plastic material layers. In this respect, a much higher generation of energy can be achieved from the friction of layers of plastic against one another than in the case of friction of plastic against metal surfaces.

Figure 3A:
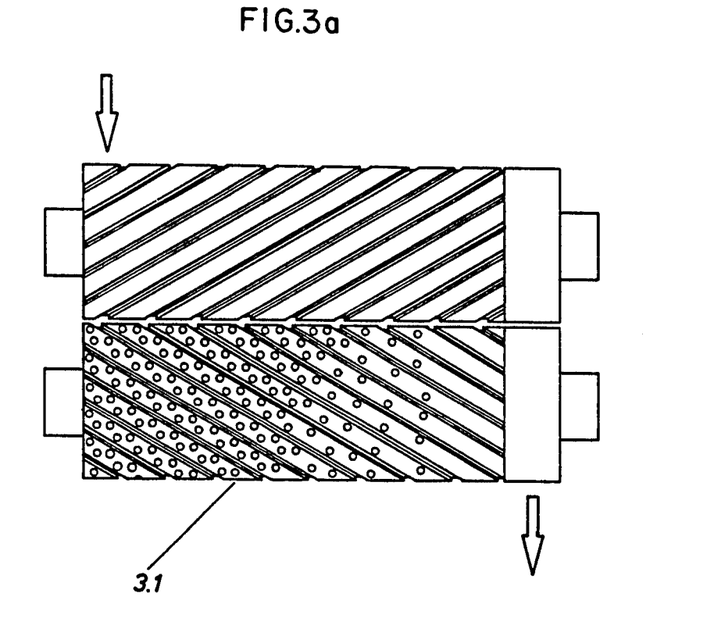
FIG. 3a is a top plan view of two adjacent rolls having a plurality of holes disposed in the smooth flights between the oblique grooves of the working roll.
Figure 3B:
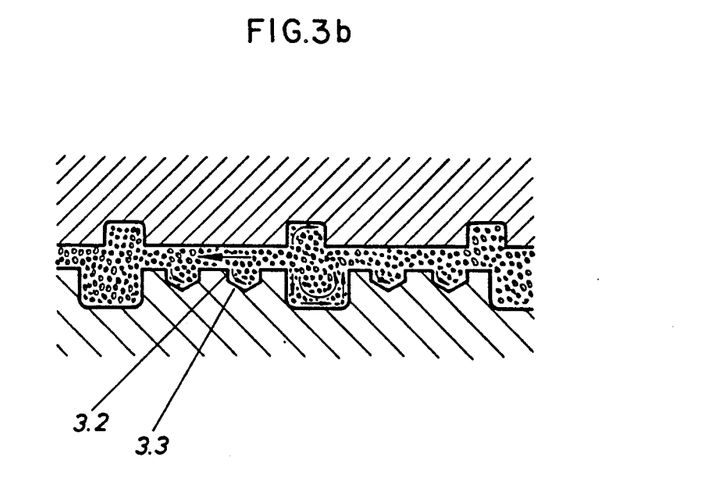
FIG. 3b is an enlarged showing of the interface of the rolls shown in FIG. 3a, FIGS. 4a and 4b show, respectively, end elevation and top plan views of the rolls wherein the counter-roll has zone-long roll sections having a counter-pitch.

As a result of this observation, referring to FIGS. 3a and 3b, the smooth flights between the oblique grooves in the charging and mixing regions of the working roll are provided with a plurality of blind holes 3.1 as pits.

A small cylindrical section 3.2 of the hole having a depth of about 0.5 to about 10 mm, preferably with a depth of about 1 to about 2.5 mm, extends into a flat-angled hole bottom 3.3 as, for example, about 120 degrees of angle or a corresponding flat rounding-out of the hole bottom.

The hole diameter is about 2 to about 20 mm, preferably about 3.5 to about 5 mm, at an overall depth of about 2 to about 3 mm. The ratio of hole diameter to hole depth is to be dimensioned such that, on the one hand, a temporary adherence or initial melting of the material takes place in the blind hole due to a somewhat longer dwell time and, on the other hand, sufficient fresh colder material is pushed in by the counter-roll to replace the contents of the hole. These blind holes made according to the present invention improve the adhesion of the material coating of the working roll by a mechanical cramping and, in addition, form heat exchange surfaces.

The gap pressure builds up fully in the region where the blind hole extends into the kneading gap of the rolls because no pressure relief can take place in the closed system; consequently, the shearing energy and swirling motion which can be introduced locally in the hole bottom by friction are correspondingly great.

In difficult cases, it is advisable also to provide the flights of the material-free counter-roll with blind holes of the type described above. However, at most, the blind holes may be approximately half as deep with the same hole diameter as the blind holes on the working roll in order that the counter-roll blind holes do not cancel out the greater material adhesion on the working roll.

The shearing roll system preferably functions with an oppositely driven but likewise grooved counter roll, which forms the other part of the shear gap without the material layer.

The object of the grooves in the counter roll is to introduce shear forces into the outer layer of the material-coated front roll, feed fresh material into this layer and generate the material shear force along the material bank.

According to a further embodiment of the present invention, the groove depth of the counter roll is much smaller than the groove depth of the material-coated front roll. The groove depth is approximately half of the working gap, for example, between about 0.3 and about 10 mm, preferably between about 1 and about 3 mm. The grooving of the counter roll is kept at the same depth from the charging zone up to the smooth outlet in the discharge region. The feed material is drawn into the working gap with the aid of these grooves and intimately mixed with the plastic material or embedded into the plastic material layer. These grooves, by means of the groove angle, push the material both in the bank and on the working roller forward in the direction of the discharge side if both rolls are oppositely driven and also have a counter-running groove angle.

Figure 4A:
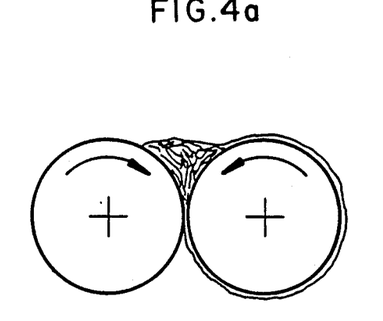
Figure 4B:
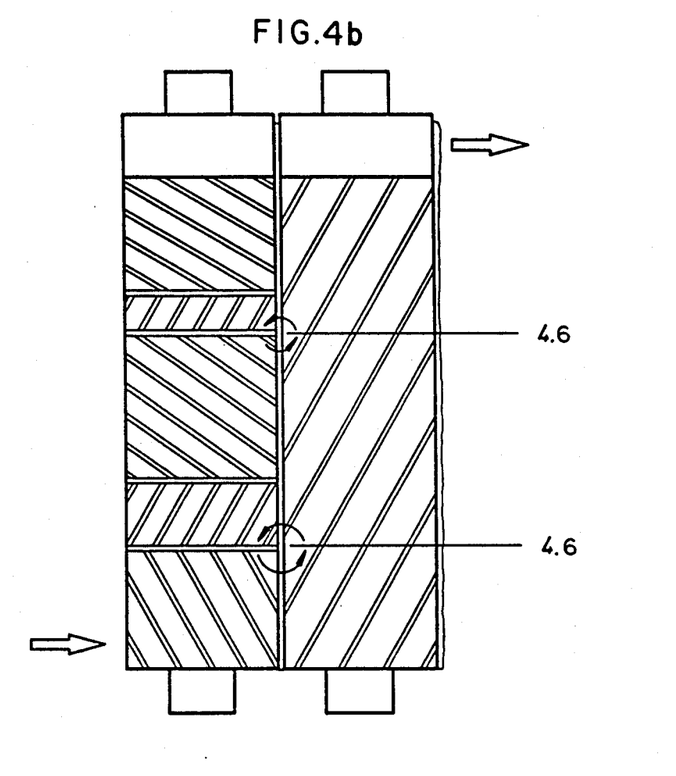

A further embodiment is shown in FIGS. 4a and 4b, in which zone-long roll sections having a counter pitch are arranged on the counter-roll for increasing the mixing effect. The counter pitch of the grooving locally generates oppositely rotating kneading swirls 4.6 perpendicular to the working gap as shown in FIG. 4b.

The zones of the counter pitch must be relatively short, otherwise the entire material transport in the kneading gap in the direction of the discharge side comes to a standstill. As a rule, at least two counter-conveying zones are arranged in the counter roll, but should only have a length of about 0.25 to about 1 times the roll diameter and must have intermediate sections with a steep conveying pitch of at least one to two roll diameters in length.

Figure 5A:
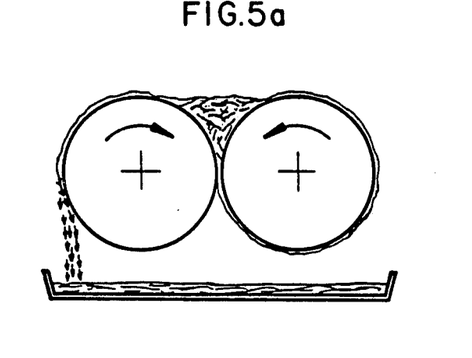
FIG. 5a is an end elevation view of the rolls coated with material overflowing into a weighing apparatus.
Figure 5B:
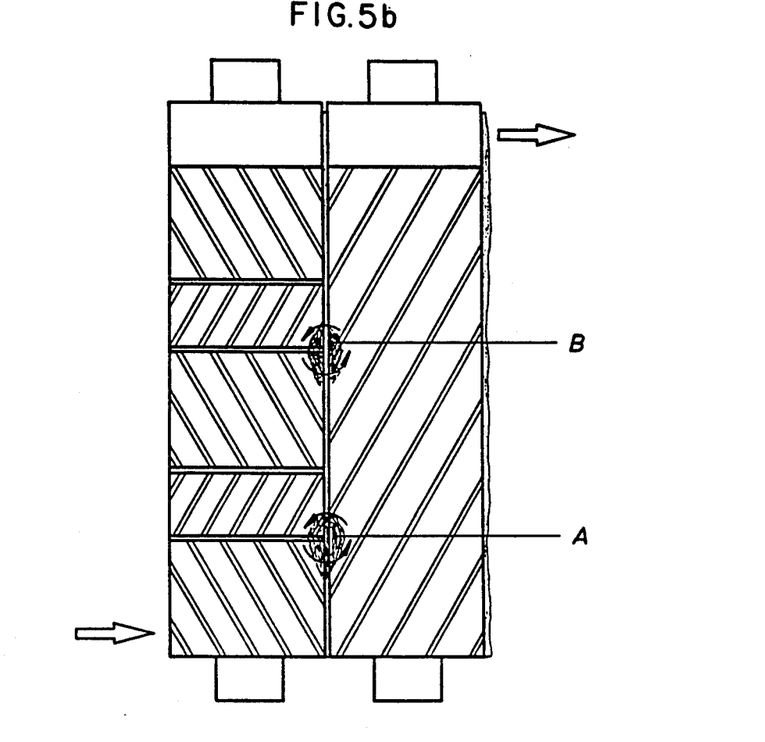
FIG. 5b is a top plan view of the rolls wherein the counter-roll is equipped with two relatively large counter-conveying sections.

Referring to FIGS. 5a and 5b, the counter roll is equipped with two relatively large counterconveying sections. While the working roll is coated with material, at each of points A and B, a liquid, for example oil in the case of rubber processing, or a liquid stabilizer B is allowed to run into the kneading gap. As long as the two rolls rotate, the liquid is conveyed by the counter-running groove pitch and reaches the material to be processed via the vertical material swirl.

According to this embodiment, two "liquid peaks" can be maintained in the gap which are high enough for the excess liquid to be able to run out to the sides over the rolls and the amount of liquid taken up can be measured by a differential weighing process, as shown in FIG. 5a.

Figure 6A:
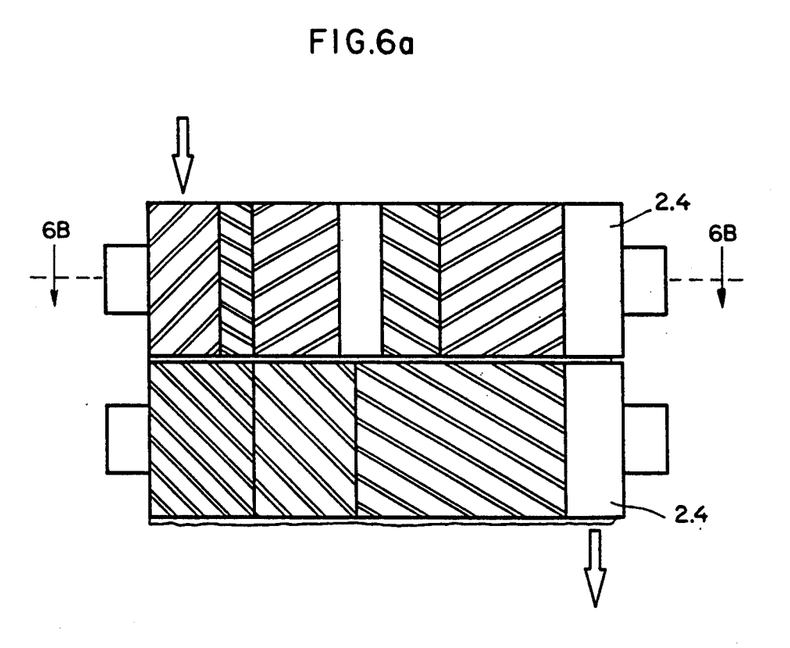
FIG. 6a is a top plan view of an arrangement of various jacket sections threaded axially onto the temperature-controlled rolls.
Figure 6B:
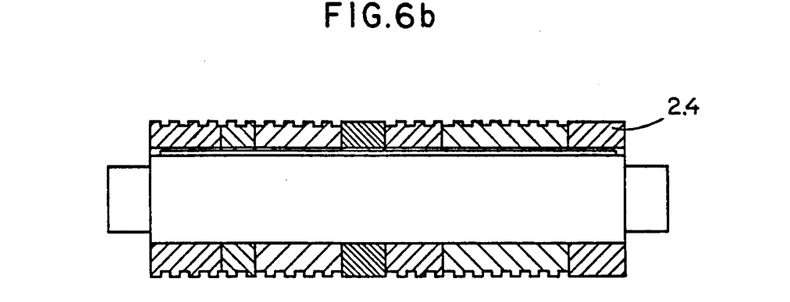
FIG. 6b is a crosssectional view taken along line 6B of the roll shown in FIG. 6a, FIGS. 7a and 7b show, respectively, a partial top plan view and an end elevation view looking from the left of FIG. 7a of a strip-cutting roll in relation to the adjacent shearing rolls.

Referring to FIGS. 6a and 6b, there is shown a design developed for optimization of the shearing rolls which permits trials to be carried out to find the optimum groove geometry in each case for the different materials by flexible successive arrangement of jacket sections having different grooving. For this purpose, the various jacket sections are threaded axially onto the temperaturecontrolled roll core and tried out. It is possible to fit the front and rear rolls with the various elements as desired.

For material discharge, the roll grooves run out in a smooth roll section 2.4 accounting for about 10% of the face width. In this region, discharge of the processed material takes place with the following devices.

Figure 7A:
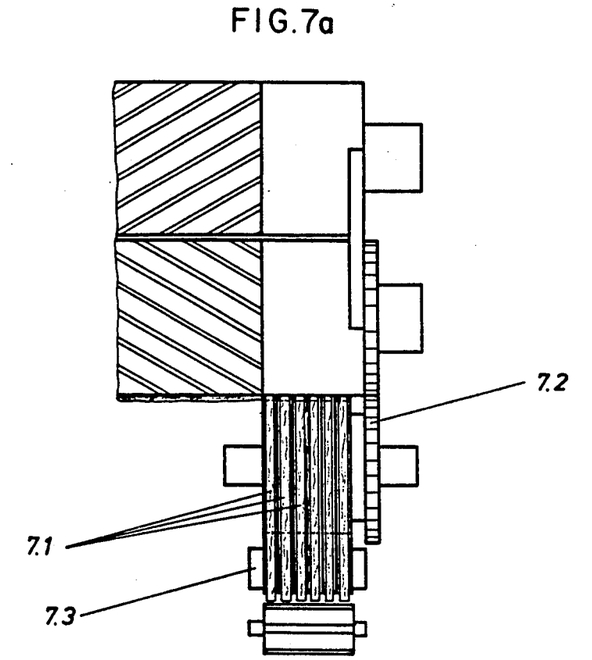
Figure 7B:
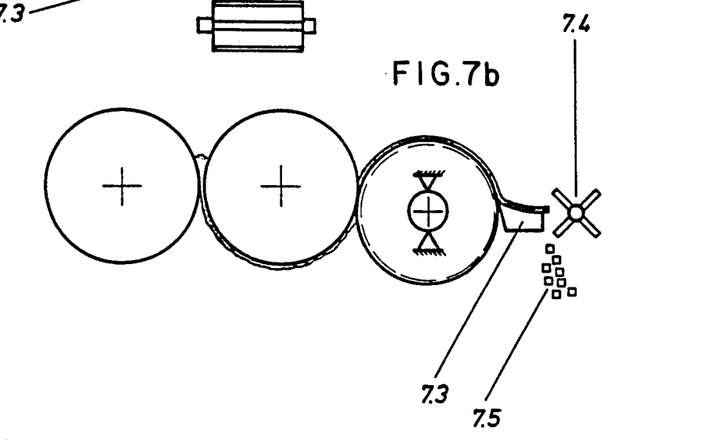

Material discharge as strips is performed with a strip cutting roll as shown in FIGS. 7a and 7b. The strip cutting roll is fitted with round cutters and driven by a gear wheel of the material roll at a slightly greater speed of approximately 5 to 10% advance. Depending on the number of cutters, several strips are produced simultaneously, which are diced into cubed pellets 7.5 in a cross-cutting device having a discharge block 7.3 and cutter roll.

Figure 8A:
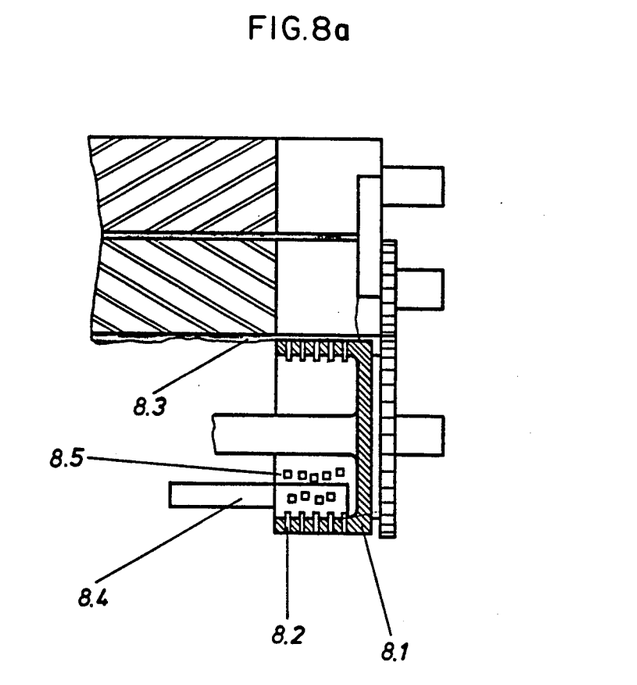
FIG. 8a is a partial top plan view of a driven hollow cylinder pressed against the plastic material layer of the working roll and FIG. 8b is an end elevation view of the apparatus shown in FIG. 8a additionally showing the hollow cylinder partially submerged in a coolant system.
Figure 8B:
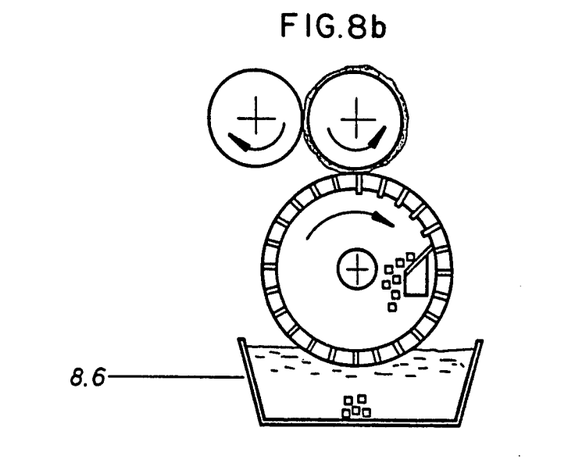

In a further embodiment, as shown in FIGS. 8a and 8b, a driven hollow cylinder 8.1 is pressed against the plastic material layer of the working roll. The jacket circumference of the cylinder contains a plurality of bore holes 8.2 through which the plastic material 8.3 is pressed into the open interior. There is a cooled cutter 8.4 which cuts off the stick sections which have been pressed through as cylindrical pellets 8.5. For the cooling of the pelletizing cylinder and the granular material contained in it, the outer jacket runs through a dish 8.6 filled with water or other coolant as shown in FIG. 8b.

Figure 9A:
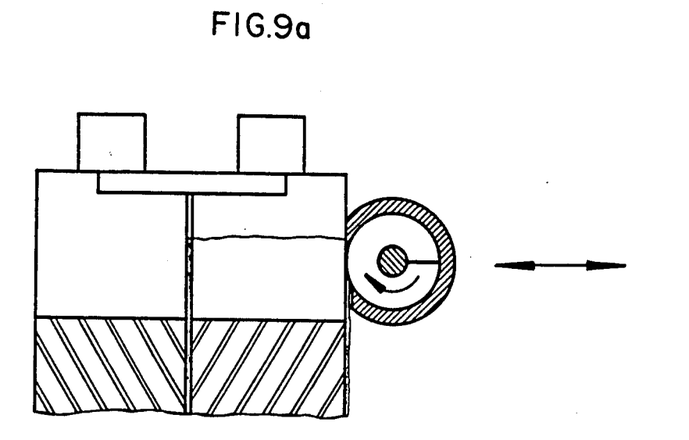
FIGS. 9a and 9b show, respectively, partial top plan and end elevation views of a discharging and shaping screw in working arrangement with the shearing rolls.
Figure 9B:
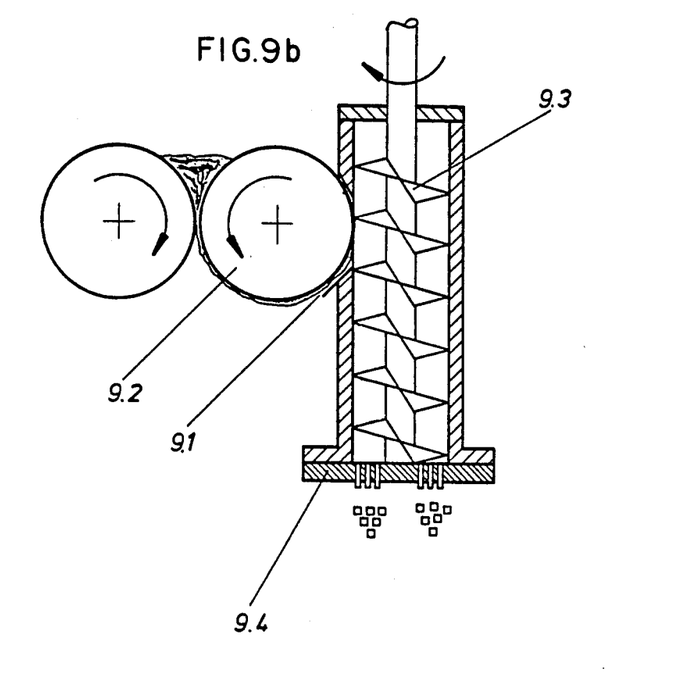

A further embodiment is shown in FIGS. 9a and 9b wherein the discharge of viscous plastic and very tacky materials from the working roll is accomplished by a discharging and shaping screw 9.3. The shaping screw 9.3 is arranged from the outside with the adapted cylinder opening 9.1 perpendicular to and in close proximity with the material-coated working roll. The flights of the rotating screw scrape the plastic material down from the smooth roll section and transfer the plastic material to a shaping die 9.4. The plastic material is then processed further in the shaping die with pelletizing or profiling equipment.

What is claimed is:

1. A mixing and shearing rolling mill for plasticizable material comprising:
    first and second adjacent rotatable rolls each having a face width comprising a plurality of independently controllable temperature zones, wherein at least two of said temperature zones are maintained at different temperatures, said face widths being more than four times the roll diameter and comprising a plurality of sharp-edged shear grooves arranged obliquely on the surface thereof at an acute angle and counter to each other, said grooves being separated by flights, both the number of the shear grooves on the roll circumference and the depth of the shear grooves increasing along the roll axis from the bearing side having a material throat up to the roll center and decreasing again from the roll center to the bearing side at the material discharge end,
    said first rotatable roll comprising a front, material-coated roll subdivided over the face width thereof into a plurality of sections having shear grooves dimensioned differently relative to one another, and a substantially non-grooved section at one end of the roll, said plurality of sections comprising:
    a first section disposed in a roll region of the material throat, the length of said first section corresponding to from about 25 to about 30% of the face width and having shear grooves of from about 0.5 to about 20 mm deep, and from about 1 to about 40 mm wide;
    an adjacent second section having a length which corresponds to from about 35 to about 40% of the face width, the depth of the shear grooves in said second section being reduced continuously to approximately half the value of the depth of the shear grooves in said first section, and
    a third section disposed adjacent to said second section, said third section having a length which corresponds to from about 25 to about 30% of the face width, and wherein the depth of the shear grooves of said third section are substantially the same as the depth of the shear grooves of said second section at the adjacent end thereof, said third section being disposed adjacent to said non-grooved section at one end of the roll, said nongrooved section corresponding to from about 10 to about 15% of the face width.

2. A mixing and shearing rolling mill according to claim 1, wherein said second rotatable roll comprises a substantially non-grooved section of the face width disposed opposite to the non-grooved section of said first roll.

3. A mixing and shearing rolling mill according to claim 1, wherein said first roll comprises smooth flights between the shear grooves, the flights of both of said first and second sections being formed with a plurality of pit-shaped blind holes.

4. A mixing and shearing rolling mill according to claim 3, wherein said blind holes have a hole diameter of from about 2 to about 20 mm, a depth of from about 0.5 to 10 mm, and a flat-angle-shaped hole bottom.

5. A mixing and shearing rolling mill according to claim 3, wherein said second rotatable roll comprises a coated roll provided with blind holes on the smooth flights between the shear grooves, said blind holes being half as deep and with the same diameter as the blind holes on said first roll.

6. A mixing and shearing rolling mill according to claim 5, wherein said second roll comprises a zonal shear groove section having shear grooves which have a counter pitch to the remaining shear grooves on the roll.

7. A mixing and shearing rolling mill according to claim 6, wherein said second roll has at least two of said zonal shear groove sections, with the overall length of said zonal shear groove sections comprising from about 0.25 to about 1 times the diameter of said roll.

8. A mixing and shearing rolling mill according to claim 7, wherein said shear grooves are disposed on jacket sections which interchangeably fit over said rolls.

9. A mixing and shearing rolling mill according to claim 1, wherein said first section comprises shear grooves 5 mm deep and 10 mm wide, and wherein said second section comprises shear grooves from about 2.0 to about 2.5 mm deep.

10. A mixing and shearing rolling mill according to claim 4, wherein said blind holes have a hole diameter of from about 2 to about 3 mm, a length of from about 1 to about 2.5 mm, and a 125°-shaped hole bottom.

11. A mixing and shearing rolling mill for plasticizable material comprising:
first and second adjacent rotatable rolls each having a face width comprising a plurality of independently controllable temperature zones, said face widths being more than four times the roll diameter and comprising a plurality of sharp-edged shear grooves arranged obliquely on the surface thereof at an acute angle and counter to each other, said grooves being separated by flights,
said first rotatable roll comprising a front, material-coated roll subdivided over the face width thereof into a plurality of sections having shear grooves dimensioned differently relative to one another, and a substantially non-grooved section at one end of the roll, said plurality of sections comprising:
a first section disposed in a roll region of a material throat, the length of said first section corresponding to from about 25 to about 30% of the face widths and having shear grooves of from about 0.5 to about 20 mm deep, and from about 1 to about 40 mm wide;
an adjacent second section having a length which corresponds to from about 35 to about 40% of the face width, the depth of the shear grooves in said second section being reduced continuously to approximately half the value of the depth of the shear grooves in said first section, and
a third section disposed adjacent to said second section, said third section having a length which corresponds to from about 25 to about 30% of the face width, and wherein the depth of the shear grooves of said third section are substantially the same as the depth of the shear grooves of said second section at the segment end thereof, said third section being disposed adjacent to said non-grooved section at one end of the roll, said non-grooved section at one end of the roll, said non-grooved section corresponding to from about 10 to about 15% of the face width.

12. A mixing and shearing rolling mill according to claim 11, wherein in said first section the shearing grooves are cut 5 mm deep and 10 mm wide, and in said second section the shearing grooves are cut 2.0 mm–2.5 mm deep.

13. A mixing and shearing rolling mill according to claim 11, wherein said first and second rolls are maintained at different temperatures in at least two of said sections.

14. A mixing and shearing rolling mill according to claim 12, wherein said first roll comprises smooth flights between the shear grooves, and the flights of both of said first and second sections are formed with a plurality of pit-shaped blind holes.

15. A mixing and shearing rolling mill according to claim 14, wherein said blind holes comprise a hole diameter of from about 2 to about 20 mm, a depth of from about 0.5 to about 10 mm, and a flat-angle-shaped hole bottom.

16. Mixing and shearing rolling mill according to claim 15, wherein said blind holes are 1–2.5 mm deep and the hole bottom has an inclination of 125°.

17. A mixing and shearing rolling mill according to claim 14, wherein said second roll comprises a coated roll provided with blind holes on the smooth flights between the shear grooves, said blind holes being half as deep and with the same diameter as the blind holes on said first roll.

18. A mixing and shearing rolling mill according to claim 16, wherein said second roll comprises a zonal shear groove section having shear grooves which have a counter pitch to the remaining shear grooves on the roll.

19. A mixing and shearing rolling mill according to claim 18, wherein said second roll has at least two of said zonal shear groove sections, with the overall length of said zonal shear groove sections comprising from about 0.25 to about 1 times the diameter of said roll.

20. A mixing and shearing rolling mill according to claim 19, wherein said shear grooves are disposed on jacket sections which interchangeably fit over said rolls.

21. A mixing and shearing rolling mill according to claim 11, further including a strip cutting roll mounted opposite and axially parallel to said non-grooved section of said first roll, said strip cutting roll being driven by said first roll through gearwheels at least 5%–10% faster than said first roll, and wherein said strip cutting roll is provided with circular cutting blades and a take-off group.

22. A mixing and shearing rolling mill according to claim 11, further including a hollow cylinder mounted adjacent and axially parallel to said non-grooved roll, said hollow cylinder being driven by said first roll by gearwheels slower than the rotational speed of said first roll, and wherein said hollow cylinder is provided with bores which are pressed against the plasticized material lying on said roll, said material being pressed through the bores and being cut into cylinder granules by a cooled blade arranged in the interior of the hollow cylinder.

* * * * *